United States Patent
Srinivasa et al.

(10) Patent No.: US 9,629,128 B2
(45) Date of Patent: Apr. 18, 2017

(54) ALTERNATE FEEDBACK TYPES FOR DOWNLINK MULTIPLE USER MIMO CONFIGURATIONS

(71) Applicant: Marvell World Trade Ltd., St. Michael (BB)

(72) Inventors: Sudhir Srinivasa, Campbell, CA (US); Hongyuan Zhang, Fremont, CA (US); Rohit U. Nabar, Sunnyvale, CA (US); Hyukjoon Kwon, San Diego, CA (US)

(73) Assignee: Marvell World Trade Ltd., St. Michael (BB)

( * ) Notice: Subject to any disclaimer, the term of this patent is extended or adjusted under 35 U.S.C. 154(b) by 6 days.

(21) Appl. No.: 14/961,420

(22) Filed: Dec. 7, 2015

(65) Prior Publication Data

US 2016/0088606 A1    Mar. 24, 2016

Related U.S. Application Data

(63) Continuation of application No. 13/161,209, filed on Jun. 15, 2011, now Pat. No. 9,209,881.
(Continued)

(51) Int. Cl.
*H04W 16/12* (2009.01)
*H04W 72/04* (2009.01)
(Continued)

(52) U.S. Cl.
CPC ...... *H04W 72/0406* (2013.01); *H04B 7/0434* (2013.01); *H04B 7/0452* (2013.01);
(Continued)

(58) Field of Classification Search
None
See application file for complete search history.

(56) References Cited

U.S. PATENT DOCUMENTS

| | | |
|---|---|---|
| 6,862,440 B2 | 3/2005 | Sampath |
| 7,039,442 B1 | 5/2006 | Joham et al. |

(Continued)

FOREIGN PATENT DOCUMENTS

| | | |
|---|---|---|
| CN | 101568129 A | 10/2009 |
| EP | 2106038 | 9/2009 |

(Continued)

OTHER PUBLICATIONS

Third Office Action in Chinese Application No. 201180023094.9, dated Feb. 6, 2016, with English translation (6 pages).
(Continued)

*Primary Examiner* — Ayaz Sheikh
*Assistant Examiner* — Sori Aga

(57) ABSTRACT

A method in a communication network includes obtaining descriptions of a plurality of communication channels each communication channel associated with a different one of a plurality of receivers; and generating a plurality of steering vectors, one for each of the plurality of receivers, using the descriptions of the plurality of communication channels; wherein each steering vector is used to transmit data to a corresponding one of the plurality receivers via a plurality of antennas and over a corresponding one of the communication channels simultaneously and wherein each steering vector is used to communicate data on a different one of the plurality of communication channels, and wherein each steering vector is generated to reduce interference on a corresponding communication channel caused by simultaneous transmission of data on other communication channels.

12 Claims, 8 Drawing Sheets

Related U.S. Application Data

(60) Provisional application No. 61/372,670, filed on Aug. 11, 2010, provisional application No. 61/370,633, filed on Aug. 4, 2010, provisional application No. 61/368,480, filed on Jul. 28, 2010, provisional application No. 61/360,361, filed on Jun. 30, 2010, provisional application No. 61/355,480, filed on Jun. 16, 2010.

(51) Int. Cl.
| | |
|---|---|
| H04B 7/04 | (2017.01) |
| H04B 7/0452 | (2017.01) |
| H04B 7/06 | (2006.01) |
| H04L 25/02 | (2006.01) |
| H04W 72/08 | (2009.01) |
| H04W 48/16 | (2009.01) |

(52) U.S. Cl.
CPC ......... *H04B 7/0617* (2013.01); *H04B 7/0634* (2013.01); *H04L 25/0204* (2013.01); *H04L 25/0228* (2013.01); *H04L 25/0242* (2013.01); *H04W 72/046* (2013.01); *H04W 72/082* (2013.01); *H04W 48/16* (2013.01)

(56) References Cited

U.S. PATENT DOCUMENTS

| | | | |
|---|---|---|---|
| 7,206,354 B2 | 4/2007 | Wallace et al. | |
| 7,486,740 B2 | 2/2009 | Inanoglu | |
| 7,599,332 B2 | 10/2009 | Zelst et al. | |
| 7,720,030 B2 | 5/2010 | Solomon et al. | |
| 7,729,439 B2 | 6/2010 | Zhang et al. | |
| 7,742,390 B2 | 6/2010 | Mujtaba | |
| 7,907,912 B2 | 3/2011 | Nam et al. | |
| 7,917,107 B2 | 3/2011 | Gu et al. | |
| 8,073,486 B2 | 12/2011 | Mundarath et al. | |
| 8,144,647 B2 | 3/2012 | Nabar et al. | |
| 8,149,811 B2 | 4/2012 | Nabar et al. | |
| 8,155,138 B2 | 4/2012 | van Nee | |
| 8,270,909 B2 | 9/2012 | Zhang et al. | |
| 8,289,869 B2 | 10/2012 | Sawai | |
| 8,472,383 B1 | 6/2013 | Banerjea et al. | |
| 8,526,351 B2 | 9/2013 | Fischer et al. | |
| 8,599,803 B1 | 12/2013 | Zhang et al. | |
| 8,619,907 B2 | 12/2013 | Mujtaba et al. | |
| 8,660,497 B1 | 2/2014 | Zhang et al. | |
| 8,724,546 B2 | 5/2014 | Zhang et al. | |
| 8,724,720 B2 | 5/2014 | Srinivasa et al. | |
| 8,873,525 B2 | 10/2014 | Liu et al. | |
| 8,885,620 B2 | 11/2014 | Liu et al. | |
| 8,886,755 B1 | 11/2014 | Liu et al. | |
| 8,923,217 B2 | 12/2014 | Liu et al. | |
| 9,209,881 B2 * | 12/2015 | Srinivasa | H04B 7/0434 |
| 2003/0153316 A1 | 8/2003 | Noll et al. | |
| 2004/0066754 A1 * | 4/2004 | Hottinen | H04B 7/0615 370/252 |
| 2005/0152299 A1 | 7/2005 | Stephens | |
| 2005/0157805 A1 | 7/2005 | Walton et al. | |
| 2005/0195733 A1 | 9/2005 | Walton et al. | |
| 2006/0063492 A1 | 3/2006 | Iacono et al. | |
| 2007/0086400 A1 | 4/2007 | Shida et al. | |
| 2007/0142089 A1 | 6/2007 | Roy | |
| 2007/0155336 A1 | 7/2007 | Nam et al. | |
| 2007/0201566 A1 | 8/2007 | Solomon et al. | |
| 2007/0253501 A1 | 11/2007 | Yamaura | |
| 2007/0293214 A1 | 12/2007 | Ansari et al. | |
| 2007/0298742 A1 | 12/2007 | Ketchum et al. | |
| 2008/0075058 A1 * | 3/2008 | Mundarath | H04B 7/043 370/342 |
| 2008/0076370 A1 | 3/2008 | Kotecha et al. | |
| 2008/0187032 A1 | 8/2008 | Pande et al. | |
| 2008/0247370 A1 | 10/2008 | Gu et al. | |
| 2009/0196163 A1 | 8/2009 | Du | |
| 2009/0245153 A1 | 10/2009 | Li et al. | |
| 2009/0274226 A1 | 11/2009 | Mondal et al. | |
| 2009/0296563 A1 | 12/2009 | Kishiyama et al. | |
| 2009/0296650 A1 | 12/2009 | Venturino et al. | |
| 2010/0041406 A1 | 2/2010 | Kim et al. | |
| 2010/0046656 A1 | 2/2010 | van Nee et al. | |
| 2010/0246524 A1 * | 9/2010 | Hou | H04B 7/063 370/329 |
| 2010/0246702 A1 | 9/2010 | Miyoshi | |
| 2010/0260159 A1 | 10/2010 | Zhang et al. | |
| 2011/0002219 A1 | 1/2011 | Kim et al. | |
| 2011/0096796 A1 | 4/2011 | Zhang et al. | |
| 2011/0164695 A1 | 7/2011 | Zheng et al. | |
| 2011/0199946 A1 | 8/2011 | Breit et al. | |
| 2011/0305205 A1 | 12/2011 | Gong et al. | |
| 2011/0310827 A1 | 12/2011 | Srinivasa et al. | |
| 2012/0039196 A1 | 2/2012 | Zhang | |

FOREIGN PATENT DOCUMENTS

| | | |
|---|---|---|
| JP | 2009-049604 A | 3/2009 |
| JP | 2010-021941 A | 1/2010 |
| WO | WO-2005/081483 | 9/2005 |
| WO | WO-2007117949 | 10/2007 |
| WO | WO-2009/002269 | 12/2008 |
| WO | WO-2009/048418 A2 | 4/2009 |
| WO | WO-2012-021449 | 2/2012 |

OTHER PUBLICATIONS

"Discussion on multiple PMI feedback," Samsung, *3GPP TSG RAN WG1 Meeting #60*, San Francisco, USA, 2 pages, (Feb. 2010).

IEEE P802.11n™ D3.00, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11 n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Chen, "Home Network Basis: Transmission Environments and Wired/Wireless Protocols," *Prentice Hall*, pp. 1-26 (Jul. 2003).

Communication in European Patent Application No. 11 752 371.2-1851, dated Apr. 20, 2015.

First Office Action in China Application No. 201180023094.9, mailed Nov. 27, 2014, with English translation (27 pages).

Gunnam et al., "Multi-Rate Layered Decoder Architecture for Block LDPC Codes of the IEEE 802.11n Wireless Standard," IEEE, 1645-1648 (2007).

Hiertz et al., "The IEEE 802.11 Universe," *IEEE Communications Magazine*, pp. 62-70, (Jan. 2010).

IEEE Std 802.11g/D8.2, Apr. 2003 (Supplement to ANSI/IEEE Std 802.11, 1999 (Reaff 2003)) Draft Supplement to Standard [for] Information technology—Telecommunications and information. exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, *The Institute of Electrical and Electronics Engineers, Inc.*, pp. 1-69 (Apr. 2003).

IEEE Standard for Information Technology—Telecommunications and information exchange between systems—Local and metropolitan area networks—Specific requirements. Part 11: Wireless LAN Medium Access Control (MAC) and Physical Layer

(56) References Cited

OTHER PUBLICATIONS (PHY)specifications. Amendment 2: Higher-speed Physical Layer (PHY) extension in the 2.4 GHz band—Corrigendum 1, IEEE Std 802.11b (1999).
IEEE Std. 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
IEEE Std. 802.11a-1999 (R2003) (Supplement to IEEE Std. 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).
IEEE Std. 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).
IEEE Std. 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).
IEEE Std. 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).
IEEE Std. 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).
IEEE Std. P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

International preliminary report on patentability from Application No. PCT/US2011/040527 dated Jan. 3, 2013.
International Preliminary Report on Patentability from PCT/US2011/046934 dated Feb. 21, 2013.
International Search Report and Written Opinion for International Application No. PCT/US2011/046934 dated Jan. 12, 2012.
International Search Report from PCT/US2011/040527 dated Sep. 22, 2011.
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).
Love et al., "An Overview of Limited Feedback in Wireless Communication Systems," IEEE J. on Selected Areas in Communications, vo. 26, No. 8, pp. 1341-1365 (Oct. 2008).
Notice of Reasons for Rejection in Japanese Application No. 2013-515481, mailed May 12, 2015, with English translation (3 pages).
Office Action in Chinese Application No. 201180038983.2, dated Feb. 4, 2015, with English translation (14 pages).
S. A. Mujtaba, "IEEE P802.11—Wireless LANs, TGn Sync Proposal Technical Specification," The Institute of Electrical and Electronics Engineers, Inc., doc.: IEEE 802.11-04/0889r6, May 2005.
Second Office Action in Chinese Application No. 201180023094.9, dated Jul. 27, 2015, with English translation (13 pages).
Shi et al., "Phase Tracking During VHT-LTF," Doc. No. IEEE 802.11-10/0771r0, The Institute of Electrical and Electronics Engineers, Inc., pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Supplement to IEEE Standard for Information technology—Telecommunications and information exchange between systems—Local and metropolitan area networks—Specific requirements. Part 11: Wireless LAN Medium Access Control (MAC) and Physical Layer(PHY) specifications. High-speed Physical Layer in the 5 GHz Band, IEEE Std 802.11a (1999).
Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).
Syafei et al., "Design of 1.2 Gbps MIMO WLAN System for 4K Digital Cinema Transmission,"IEEE 20th Int'l Symposium on Personal, Indoor and Mobile Radio Communications (PIMRC 2009), *The Institute of Electrical and Electronics Engineers*, pp. 207-211 (2009).
Van Nee et al. "The 802.11 n MIMO-OFDM Standard for Wireless LAN and Beyond," Wireless Personal Communications, vol. 37, pp. 445-453 (Jun. 2006).
Van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).
Written Opinion from PCT/US2011/040527 dated Sep. 22, 2011.
Zhang et al., "11 ac Explicit Sounding and Feedback", *The Institute of Electrical and Electronics Engineers*, doc. No. IEEE 802.11-10/11 05r0, 44 pages (Sep. 2010).
Zhang et al., "Applying Antenna Selection in WLANs for Achieving Broadband Multimedia Communications," *IEEE Trans. on Broadcasting*, vol. 52, No. 4, pp. 475-482 (Dec. 2006).
Zhang et al., "Asynchronous Interference Mitigation in Cooperative Base Station Systems," IEEE Trans. on Wireless Communications, vol. 7, No. 1, (Jan. 2008).
Communication in European Application No. 11 728 131.1-1874, dated Mar. 15, 2016 (5 pages).

\* cited by examiner

ALTERNATE FEEDBACK TYPES FOR DOWNLINK MULTIPLE USER MIMO CONFIGURATIONS

CROSS-REFERENCES TO RELATED APPLICATIONS

This application is a continuation of U.S. application Ser. No. 13/161,209 entitled "Alternate Feedback Types for Downlink Multiple User MIMO Configurations," filed on Jun. 15, 2011, which claims the benefit of U.S. Provisional Patent Application No. 61/355,480, filed on Jun. 16, 2010; 61/360,361, filed on Jun. 30, 2010; 61/368,480, filed on Jul. 28, 2010; 61/370,633, filed on Aug. 4, 2010; and 61/372,670, filed on Aug. 11, 2010. The entire disclosures of all the above applications are hereby incorporated by reference herein in their entireties.

FIELD OF THE DISCLOSURE

The present disclosure relates generally to communication networks and, more particularly, to wireless networks that utilize spatial division multiple access (SDMA).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac that will be operated in the 5 GHz bands overlapping with legacy IEEE 802.11a/n systems, and with promises of throughputs exceeding 6.9 Gbps. Unlike the other standards, the 802.11ac Standard will allow simultaneous communication from an access point to multiple different client stations.

WLANs typically operate in either a unicast mode or a multicast mode. In the unicast mode, an access point (AP) transmits information to one user station at a time. In the multicast mode, the same information is transmitted to a group of client stations concurrently. With IEEE 802.11ac Standard, the multicast mode is able to transmit to multiple client stations at a time.

Antennas and, accordingly, associated effective wireless channels are highly directional at frequencies near or above 60 GHz. When multiple antennas are available at a transmitter, a receiver, or both, it is therefore important to apply efficient beam patterns using the antennas to better exploit spatial selectivity of the corresponding wireless channel. Generally speaking, beamforming is a signal processing technique for using multiple transmit antennas to produce an output that combines constructively at one or more receive antennas, e.g., by producing antenna gain pattern having one or more high gain lobes or beams (as compared to the gain obtained by an omni-directional antenna) at the receive antennas, with reduced gain in other directions. If the gain pattern for multiple transmit antennas, for example, is configured to produce a high gain lobe in the direction of a receiver, better transmission reliability can be obtained over that obtained with an omni-directional transmission.

SUMMARY

In an embodiment, a method in a communication network includes obtaining descriptions of a plurality of communication channels each communication channel associated with a different one of a plurality of receivers; and generating a plurality of steering vectors, one for each of the plurality of receivers, using the descriptions of the plurality of communication channels; wherein each steering vector is used to transmit data to a corresponding one of the plurality receivers via a plurality of antennas and over a corresponding one of the communication channels simultaneously and wherein each steering vector is used to communicate data on a different one of the plurality of communication channels, and wherein each steering vector is generated to reduce interference on a corresponding communication channel caused by simultaneous transmission of data on other communication channels.

In another embodiment, an apparatus includes a steering vector controller to receive from a plurality of receivers descriptions of a plurality of communication channels, each communication channel associated with a different one of the plurality of receivers and to generate a plurality of steering vectors, one for each of the plurality of receivers, wherein each steering vector is used to transmit data to a corresponding one of the plurality receivers via a plurality of antennas and over a corresponding one of the communication channels simultaneously, and wherein each steering vector is used for communicating data on a different one of the plurality of communication channels, and wherein each steering vector is generated to reduce interference on a corresponding communication channel caused by simultaneous transmission of data on other communication channels.

In another embodiment, a system includes a transmitter including a plurality of antennas, and a steering vector controller, wherein the system further comprises a plurality of receivers, wherein the transmitter and each of the plurality of receivers are associated with a corresponding communication channel to define a plurality of communication channels, and wherein the steering vector controller is configured to generate a plurality of steering vectors based on a feedback steering matrices received from each of the plurality of receivers, wherein the plurality of steering vectors are used to simultaneously transmit a plurality of data units to the plurality of receivers via the plurality of antennas over the plurality of communication channels.

In another embodiment, a system includes a transmitter including a plurality of antennas, and a steering vector controller, wherein the system further comprises a plurality of receivers, wherein the transmitter and each of the plurality of receivers are associated with a corresponding communication channel to define a plurality of communication channels, and wherein the steering vector controller is configured to generate a plurality of steering vectors based on a feedback null-steering vectors received from each of the plurality of receivers, wherein the plurality of steering vectors are used to simultaneously transmit a plurality of data units to the plurality of receivers via the plurality of antennas over the plurality of communication channels, wherein each null-steering vector defines a null-space projection of a corresponding one of the communication channels.

In yet another embodiment, a system includes a transmitter including a plurality of antennas, and a steering vector controller, wherein the system further comprises a receiver, wherein the transmitter and the receiver are associated with a communication channel, wherein the receiver is configured to generate a null-steering vector defining a null-space projection of the communication channel and to communicate the null-steering vector to the transmitter, and wherein the steering vector controller is configured to generate a steering matrix from the null-steering vector, where the steering matrix is used to communicate data from the transmitter to the receiver on the communication channel.

In another embodiment, a method in a communication network, includes obtaining, from a receiver, a null-steering vector defining a null-space projection of a communication channel between a transmitter and the receiver; and generating a steering matrix from the null-steering vector, where the steering matrix is used to communicate data from the transmitter to the receiver on the communication channel.

DETAILED DESCRIPTION

In embodiments described below, a wireless network device such as an access point (AP) of a wireless local area network (WLAN) transmits independent data streams to multiple client stations simultaneously via an antenna array. To reduce interference at a receiving station due to transmissions from the AP to one or more other stations, the AP develops respective transmit (Tx) beamsteering (hereinafter, "steering") vectors for downlink transmissions to each station. In an embodiment, the AP develops a Tx steering vector for a certain station using a description of the wireless communication channel between the AP and the station, as well a description of at least one other wireless communication channel between the AP and another station. In another embodiment, the AP uses the description of the wireless channel between the AP and a plurality of stations to develop a Tx steering vector for each station. At various points throughout this description, examples are described using the term beamsteering. However, it will be appreciated that the these beamsteering techniques may alternatively or in some examples be characterized as beamforming techniques, and vice versa.

Thus, in some embodiments, e.g., in some explicit beamforming embodiments, an AP obtains a description of several wireless communication channels (hereinafter, "channel descriptions") through which the AP transmits data to corresponding stations. As discussed below, the AP uses the channel descriptions to generate Tx steering vectors so as to cancel or minimize known interference at each station as well as interference between space-time streams at each station. In at least some of these embodiments, the AP develops multiple Tx steering vectors corresponding to different stations at the same time. That is, the client device may feedback to the AP a channel estimation, i.e., some form of description of a channel estimate (including uncompressed/compressed steering vectors, null space vectors, etc.). The AP receives the information from all the clients and determines its final steering vectors.

In other examples, e.g., in some implicit beamforming embodiments, each of the clients sends packet data to the AP, which then performs channel estimation for channels for each of the different clients, from which final steering vectors are determined.

Figure 1:
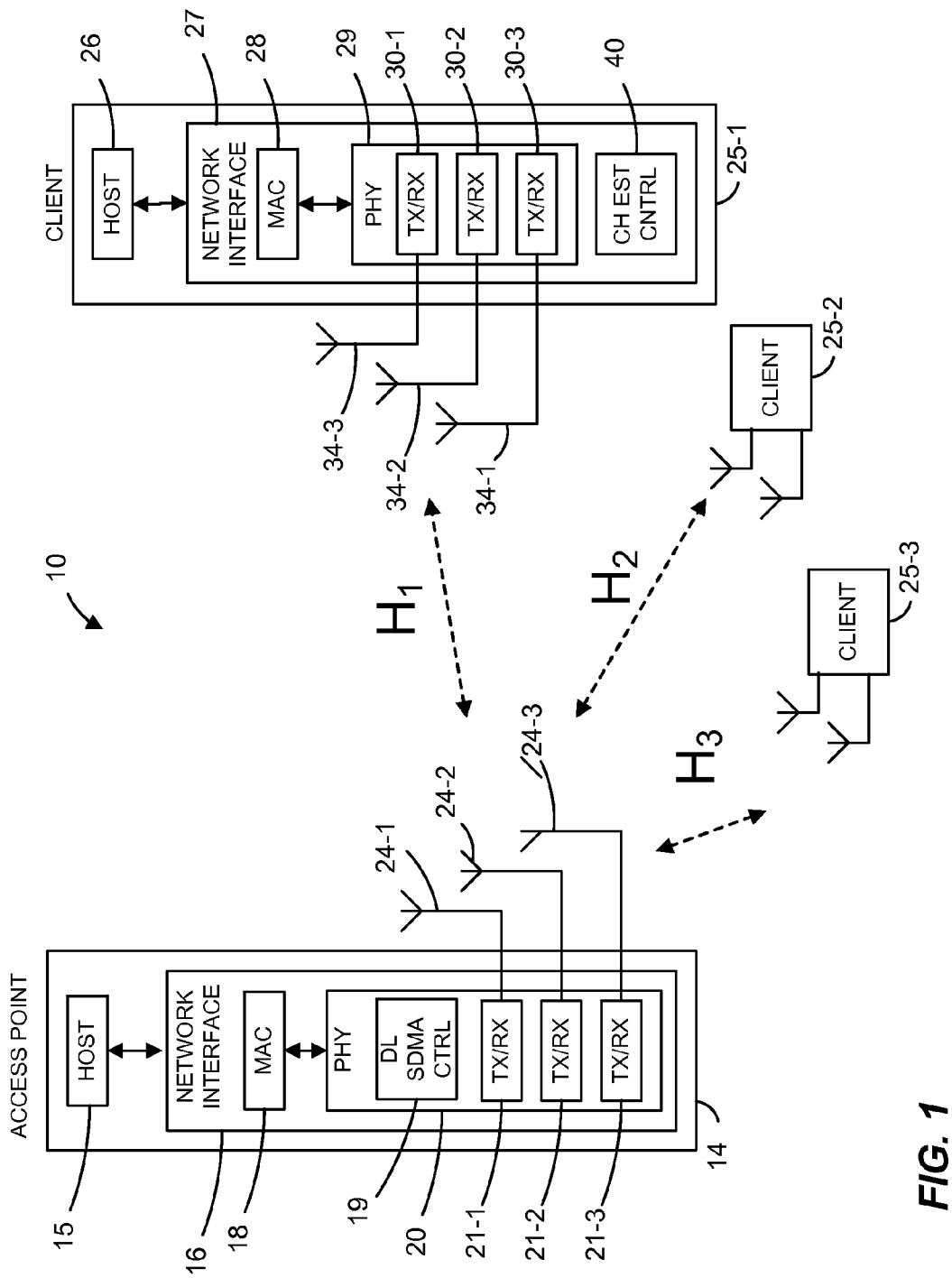
FIG. 1 a block diagram of an example wireless local area network (WLAN) in which an access point (AP) utilizes downlink (DL) Spatial-Division Multiple Access (SDMA) steering techniques in accordance with an embodiment of the present disclosure.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes $N_T$ transceivers 21, and the transceivers are coupled to $N_T$ antennas 24. Although three transceivers 21 and three antennas 24 are illustrated in FIG. 1 (i.e., $N_T$=3), the AP 14 can include different numbers (e.g., $N_T$=2, 4, 5, 6, 7, 8, etc.) of transceivers 21 and antennas 24 in other embodiments. The PHY unit 20 also includes a downlink (DL) Spatial-Division Multiple Access (SDMA) controller 19 that implements one or several of the techniques for developing steering vectors described herein.

The WLAN 10 includes K client stations 25, each station 25-$i$ equipped with $N_i$ antennas. Although three client stations 25 are illustrated in FIG. 1 (i.e., K=3), the WLAN 10 can include different numbers (e.g., K=2, 4, 5, 6, etc.) of client stations 25 in various scenarios and embodiments. Two or more of the client stations 25 are configured to receive corresponding data streams having been simultaneously transmitted from the AP 14.

A client station 25-1 includes a host processor 26 coupled to a network interface 27. The network interface 27 includes a MAC unit 28 and a PHY unit 29. The PHY unit 29 includes $N_1$ transceivers 30, and the $N_1$ transceivers 30 are coupled to $N_1$ antennas 34. Although three transceivers 30 and three antennas 34 are illustrated in FIG. 1 (i.e., $N_1$=3), the client station 25-1 can include different numbers of transceivers 30 and antennas 34 (e.g., $N_1$=1, 2, 4, 5, etc.) in other embodiments. The PHY unit 27 may include, in some embodiments, a channel estimation controller 40 that implements portions of the techniques for developing steering vectors described herein. The client stations 25-2 and 25-3 have a structure that is the same as or generally similar to the client station 25-1.

In an embodiment, each of the client stations 25-2 and 25-3 is structured like the client station 25-1 but has only two transceivers and two antennas (i.e., $N_2=N_3=2$). In other embodiments, the client stations 25-2, and 25-3 can include different numbers of antennas (e.g., 1, 3, 4, 5, 6, 7, 8, etc.). Although, only an example implementation, in the IEEE 802.11ac Standard, it is believed that the AP will have up to 8 antennas and support simultaneously communication with up to 4 stations.

In the illustrated embodiment, the AP 14 is configured to transmit multiple spatial streams simultaneously to the client stations 25-1, 25-2, and 25-3, so that each of client stations 25-$i$ receives data via $L_i$ spatial streams. For example, the client station 25-1 receives data via three (i.e., $L_1=3$) spatial streams. Although in this example $L_1=N_1$, a client station 25-$i$ in general can utilize fewer spatial streams than the number of antennas with which the client station 25-$i$ is equipped. Further, when space-time coding is employed, the multiple spatial streams are sometimes referred to as space-time streams. If the number of space-time streams is less than the number of transmit chains, spatial mapping is employed, in some embodiments.

In an embodiment, the AP 14 communicates with the client station 25-1 over a multiple input, multiple output (MIMO) channel defined, at the one end, by the array including the antennas 24-1, 24-2, and 24-3 and, at the other end, by the array including the antennas 34-1, 34-2, and 34-3. For this example, the MIMO channel can be described by a three-by-three channel matrix $H_1$ that specifies, in each element, a channel gain parameter for a stream defined by the corresponding transmit antenna and a receive antenna and a channel phase between the corresponding pairs of antennas. Similarly, the AP communicates with the clients 25-2 and 25-3 via MIMO channels described by matrices $H_2$ and $H_3$, respectively. In at least some embodiments, the dimensionality of a matrix $H_i$ describing a MIMO channel between the AP 14 and a client station 25-$i$ is $N_i \times N_T$.

For protocols like 802.11n, which support transmit beamforming in an optional mode, or protocols like 802.11ac, which support transmit beamforming to multiple users simultaneously, the AP 14 will steer the downlink channel, described by the channel descriptor, $H_i$, to an intended receiver station using the one or more spatial streams ($L_i$), where such steering improves the signal-to-noise ratio at the intended station. Beamforming generally requires (at least partial) channel knowledge at the AP, where that channel knowledge may be obtained at the AP through explicit beamforming, in which the receiver station communicates through a feedback packet the channel knowledge obtained from a sounding packet form the AP, or through implicit beamforming, in which the station sends a sounding packet on the reverse link to the AP, which then determines a steering matrix.

With respect to FIG. 1, to develop the steering matrices for each station, the system can be modeled as though the AP 14 is transmitting a symbol to a client station 25-$i$ as a transmit symbol vector $x_i$ of dimensionality $L_i \times 1$, and the client station 25-$i$ receives a signal that can be represented as a vector $y_i$ of dimensionality $N_i \times 1$.

Therefore, in an embodiment, communication is modeled as though the AP 14 would apply a respective steering vector $W_i$ of dimensionality $N_T \times L_i$ to a transmit symbol vector $x$, for transmitting the signal via the corresponding channel $H_i$. Thus, when the AP 14 simultaneously transmits data to stations 25-1, 25-2, . . . 25-K, the signal received at the client station 25-$i$ can be expressed as $$y_i = \underbrace{H_i W_i x_i}_{intended} + \underbrace{H_i \sum_{k \neq i} W_k x_k}_{interference} + \underbrace{n_i}_{noise} \quad \text{(Eq. 1)}$$

As illustrated by Eq. 1, the received signal would include an intended component, an interference component due to signals intended for other client stations, and a noise component (expressed as a vector $n_i$ of dimensionality $N_i \times 1$). Eq. 1 also can be written as $$y_i = H_i W_i x_i + H_i \sum_{k \neq i} W_k x_k + n_i = \quad \text{(Eq. 2)}$$

$$H_i [W_1 \quad W_2 \quad \ldots \quad W_K] \begin{bmatrix} x_1 \\ x_2 \\ \vdots \\ x_K \end{bmatrix} + n_i =$$

$$= H_i W x + n_i, \quad i = 1 \ldots, K$$

where $$W = [W_1 \quad W_2 \quad \ldots \quad W_K], x = \begin{bmatrix} x_1 \\ x_2 \\ \vdots \\ x_K \end{bmatrix}$$

Further, the signals $y_1, y_2, \ldots y_K$ can be "stacked" together to define an aggregate receive vector $y$:

$$y = \begin{bmatrix} y_1 \\ y_2 \\ \vdots \\ y_K \end{bmatrix} = H_T W x = \begin{bmatrix} x_1 \\ x_2 \\ \vdots \\ x_K \end{bmatrix} + x = \begin{bmatrix} n_1 \\ n_2 \\ \vdots \\ n_K \end{bmatrix} = H_W x + n \quad \text{(Eq. 3)}$$

where $$H_T = \begin{bmatrix} H_1 \\ H_2 \\ \vdots \\ H_K \end{bmatrix}, H_W = \begin{bmatrix} H_1 W_1 & H_1 W_2 & \ldots & H_1 W_K \\ H_2 W_1 & H_2 W_2 & \ldots & H_2 W_K \\ \vdots & \vdots & \vdots & \vdots \\ H_K W_1 & H_K W_2 & \ldots & H_K W_K \end{bmatrix}, \text{ and}$$

$$n = \begin{bmatrix} n_1 \\ n_2 \\ \vdots \\ n_K \end{bmatrix}.$$

To improve the overall throughput of the WLAN 10, it is desirable to reduce the interference components as much as possible for as many stations as possible, preferably without attenuating the intended components. To this end, in other embodiments, the DL SDMA controller 19 develops the aggregate steering matrix W (that includes the individual vectors $W_i, W_2, \ldots W_K$) so as to achieve a configuration optimal for the overall group of K client stations 25, i.e., with a reduction in the interference between the AP and each station, based on simultaneous communications with the other stations. In other embodiments, the DL SDMA controller 19 develops vectors $W_i$ individually (e.g., sequentially), but still such that any interference from other stations is reduced or canceled. It is noted that the reduction of interference could be for all or fewer than all of the receiver stations. For example, the DL SDMA controller 19 may use channel information to reduce interference for only the highest priority user, those users having priority above a certain threshold level, or the users in their order of priority. That is, in some embodiments, the amount of interference reduction will depend upon how the interference reduction is executed. Further still, the reduction in interference described herein is but an example of how the channel information may be used. The DL SDMA controller 19 may use the channel information to optimize any suitable metric. Even further still, while these examples are discussed in reference to the DL SDMA controller 19, it will be understood that these techniques may be partially implemented at one or more of the client stations 25-$i$, i.e., in conjunction with the channel estimation controller 40.

Figure 2:
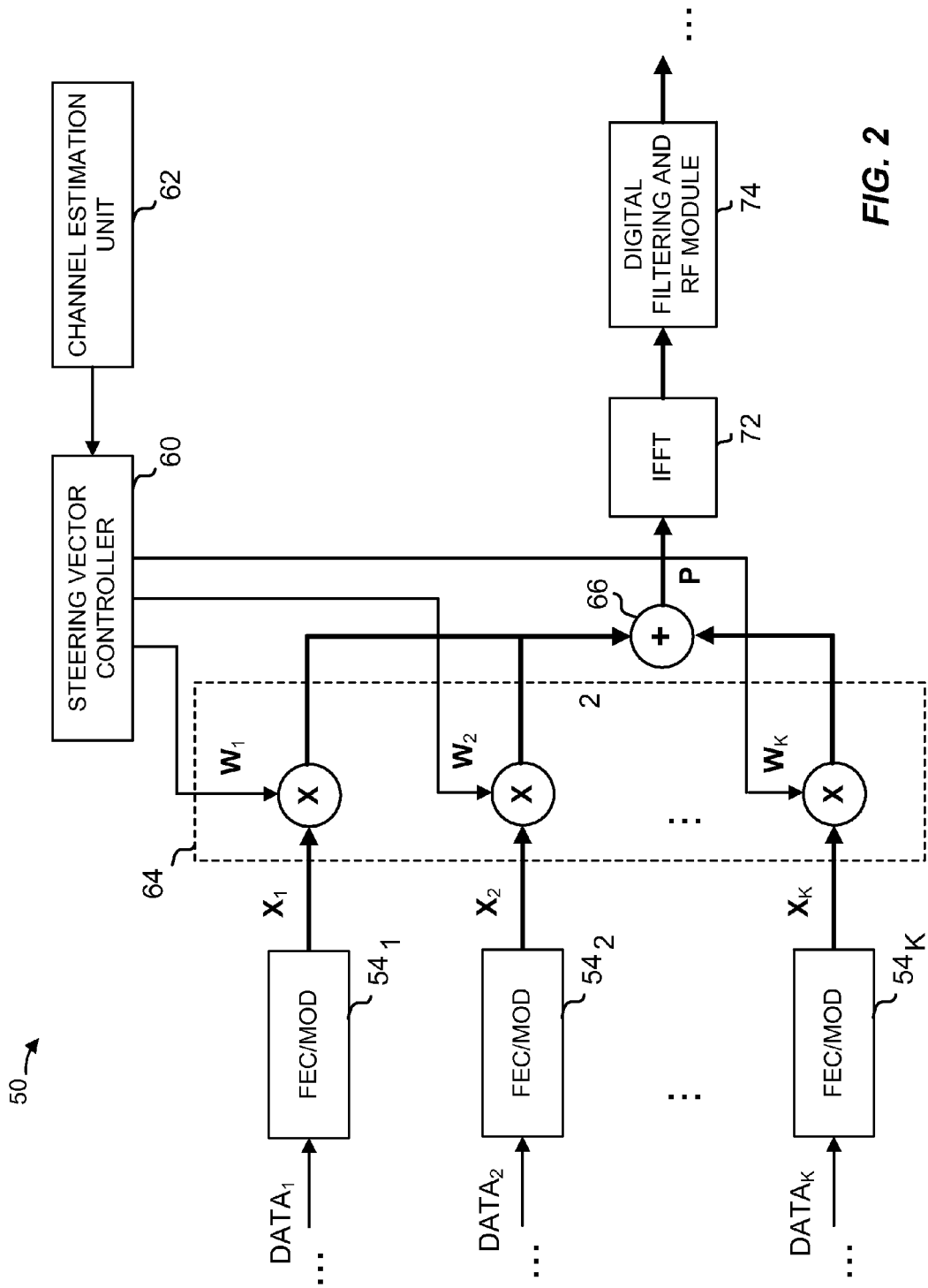
FIG. 2 is a block diagram of a DL SDMA controller that is used in an AP that implements steering techniques of the present disclosure, according to an embodiment.

Referring to FIG. 2, an SDMA controller 50 illustrates operation of the DL SDMA controller 19, according to an embodiment, and operation of the DL SDMA controller 19 and the channel estimation controller 40 according to another embodiment. That is, the techniques herein described may be implemented at the AP or partially at the AP and the client device. Implemented in the AP 14, the SDMA controller 50 receives a plurality data streams $DATA_1, DATA_2, \ldots DATA_K$ to be simultaneously transmitted to respective client stations. Depending on the embodiment, the data streams $DATA_1, DATA_2, \ldots DATA_K$ include packets, frames, or other data units. A set of K forward error correction (FEC) and modulation units 54 processes the data streams $DATA_1, DATA_2, \ldots DATA_K$ to generate transmit symbol vectors $x_i, x_2, \ldots x_K$. A spatial steering unit 64 then applies a respective steering vector $W_i$ to each transmit symbol vector $x_i$. In an embodiment, an adder 66 combines the resulting product vectors into an aggregate product vector.

In an embodiment, a steering vector controller 60 receives channel descriptions from a channel estimation unit 62 to develop steering vectors $W_i, W_2, \ldots W_K$ that are supplied to the spatial steering unit 64. According to an embodiment, each channel description includes channel gain parameters (which may be complex numbers) for various streams defined by transmit and receive antennas. A channel description in some embodiments is represented in a matrix format. In some embodiments, the multiple station channel estimation unit 62 performs measurement of one or several parameters associated with the physical channel to develop channel state information (CSI) or another metric used for determining steering vectors $W_i, W_2, \ldots W_K$. The AP 14 may obtain channel descriptions of a downlink channel between the AP 14 and each of the stations, 25-1 ... 25-K, through obtaining a CSI feedback determined at and provided from each of the stations, 25-$i$. For example, for explicit beamforming, the channel estimation block 62 is implemented on the client station 25-I, e.g., through the channel estimation controller 40, where the channel estimation information is determined, for example, in response to a sounding packet from the AP. In some embodiments, the AP sends different sounding packets to each of the client devices, e.g., in a multicast manner. In any event, the client device 25-$i$ transmits its determined channel estimation information to the AP 14, where the steering vector controller 60 is contained. For CSI feedback, for example, the AP 14 sounds a downlink channel, using one or more spatial streams, $L_i$, to each of the stations separately, from which each client then estimates its own channel from the received sounding packet and feeds back a quantized version of the estimated channel. In some examples, for the channel estimation unit 62 and steering vector controller 60 to develop steering vectors $W_i, W_2, \ldots W_K$, in explicit beamforming, the channel estimation unit 62 receives feedback signals from each of the stations, so that the DL SDMA controller 19 can properly determine the appropriate steering vectors that minimize or reduce interference at each station. Therefore, in a CSI feedback implementation, the channel estimation unit 62 receives CSI feedback from all stations.

For implicit beamforming, the channel estimation unit 62 is implemented at the AP. In an embodiment, each station 25-$i$ sends an uplink sounding packet to the AP 14, which sounding packets are received at the channel estimation unit 62. The channel estimation unit 62 performs the channel estimation in response and communicates with the steering vector controller 60 directly, where the controller 60 determines the steering vectors for each client device for reduced interference. Thus, in an example implicit beamforming embodiment, the channel estimation unit 62 at the AP 14 estimates the downlink channel based on received uplink sounding packets from the stations 25-I, and without a feedback signal While CSI feedback does not involve the determination of any steering matrix computation at the station end, the amount of information fed back is generally quite large. Therefore, while CSI feedback is more useful in beamforming protocols like 802.11n, the throughput of CSI feedback may be considered prohibitively high for MUMIMO protocols, such as 802.11ac, which can have 8 or more transmit antennas and transmit to 4 or more receiver stations simultaneously.

Therefore, in some examples, the multiple station channel estimation unit 62 develops steering vectors $W_i, W_2, \ldots W_K$ based on feedback information other than CSI feedback. In general, the channel estimation unit 62 can implement any suitable technique for developing channel descriptions, including those currently known to those of ordinary skill in the art. Described below, however, are additional alternative feedback information types the channel estimation unit 62 receives, including steering matrix feedback, a null-space feedback, and a hybrid feedback scheme.

Applying the techniques described herein, the steering vector controller 60 in an embodiment generates the steering vectors $W_i, W_2, \ldots W_K$ concurrently in view of multiple channel descriptors $H_1, H_2, \ldots H_K$ to minimize (or, at least, attempt to minimize) interference at each station, in particular interference from communication with other stations. With feedback information and channel estimation unit 62, the steering vector controller 60 can implement any known techniques to calculate the steering vectors, including a zero-forcing (ZF) technique, a minimum mean square error (MMSE) technique, a leakage suppression (LS) technique, and a block nullification (BN) technique. In embodiments where the AP is only communicating with a single station, the controller 60 may use a single-user beamforming (SU-BF) technique.

With continued reference to FIG. 2, the output of the adder 66 (e.g., an aggregate product vector P) is supplied to an inverse discrete Fourier transform module (e.g., an inverse fast Fourier transform (IFFT) module) 72, according to an embodiment. The IFFT module 72 in turn is coupled to a digital filtering and RF module 74. Once processed by the IFFT module 72 and the digital filtering and RF module 74, the data corresponding to the aggregate product vector is transmitted via an antenna array. As indicated above, an efficient set of steering vectors $W_i, W_2, \ldots W_K$ results in a transmission pattern such that the intended components of the transmitted signals are transmitted to the corresponding receiving stations simultaneously, while the interference components at each station are minimized, e.g., reduced to zero or nearly zero.

In some embodiments, feedback information sent from the stations to the AP 14 is a feedback steering matrix, $V_k$, sent either in a compressed or uncompressed form. After receiving a sounding packet on a downlink channel from the AP 14, the station computes the full channel estimate, e.g., through known techniques, from which each station computes the beamforming steering matrix, $V_k$, for example at the channel estimation controller 40. Unlike 802.11n, however, in MUMIMO protocols, like 802.11ac, the AP 14 cannot directly apply the feedback steering matrix $V_k$ as the steering matrix for a particular station K, because of the need for the AP to simultaneously communicate with other stations. Therefore, as illustrated in the example of FIG. 3, after receiving the steering matrix feedback from all K stations, the AP 14 will compute the steering matrices to be used for each station, to avoid or mitigate multi-station, also termed "multi-user," interference at each of the stations.

Figure 3:
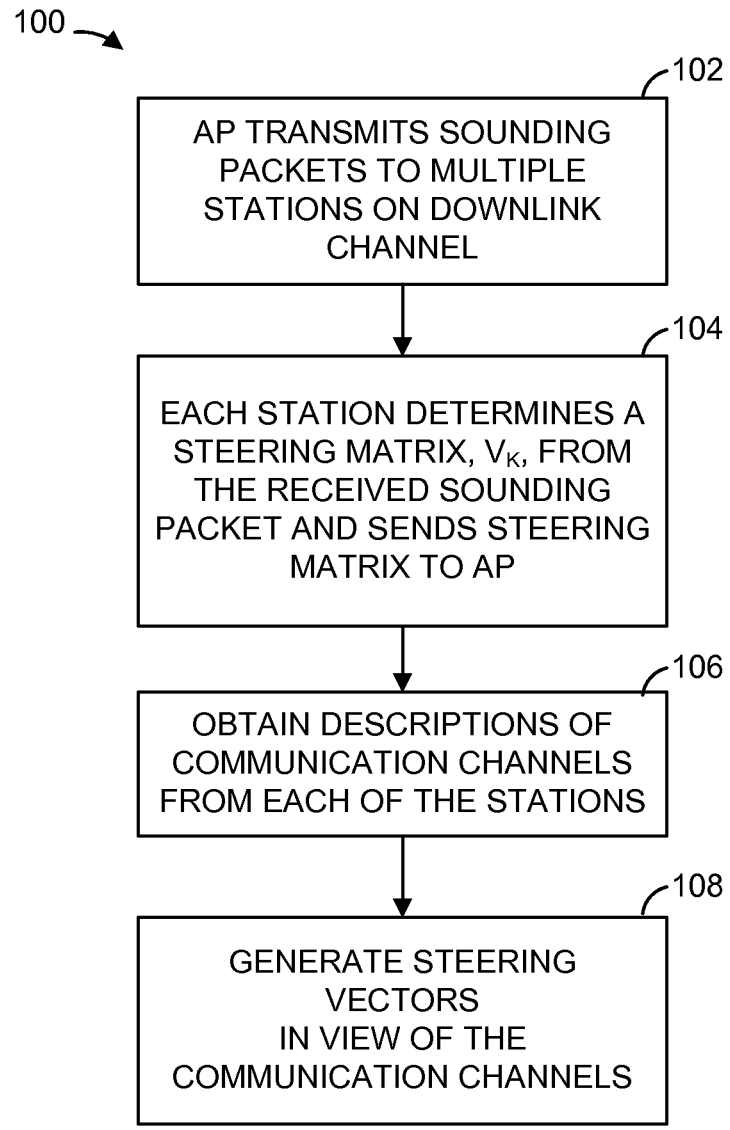
FIG. 3 is a flow diagram of an example method for generating steering vectors for use in simultaneous DL SDMA transmissions to multiple stations using a feedback steering matrix, according to an embodiment.

FIG. 3 illustrates an example method 100 for developing steering vectors for simultaneous transmission of data to two or more stations. The DL SDMA controller 19 or the SDMA controller 50, for example, are configured to implement at least partially the method 100, according to some embodiments, where some of the functionality may be implemented by the channel estimation controller 40 on the client device 25-i. In the method 100, each of the stations, 25-1 ... 25-K, determine their respective feedback steering matrix, $V_1$ ... $V_K$, and feedback their matrix to the AP 14, and more specifically to the channel estimation unit 62, for determining steering vectors $W_1, W_2, \ldots W_K$. Because, in this embodiment, the stations feedback matrices that span the entire downlink channel space, this technique is termed "range feedback" herein.

At a block 102, the AP 14 transmits sounding packets on different spatial streams to multiple different stations. Two examples are discussed, one in which the AP 14 sends sounding packets to two stations, K=2, i.e., 25-1 and 25-2, and another in which the AP sends sounding packets to three stations, K=3, i.e., 25-1, 25-2, and 25-3. In other examples, the AP 14 transmits sounding packets to any number of users, K=3, 4, etc.

In some embodiments, at a block 104, as may be implemented by the channel estimation controller 40, each of the stations 25-1 and 25-2 decomposes the received sounding packet, for example, using a singular value decomposition (SVD) on the received downlink channel. In other examples, other techniques for handling the received sounding packet may be used in place of SVD. Station 25-1 determines its feedback steering matrix $V_1$; while station 25-3 determines its feedback steering matrix, $V_2$. In some embodiments, the feedback steering matrices, $V_K$, may be determined from all of the spatial streams, $L_i$, used to send the sounding packet on the downstream link. In other embodiments, each station uses a subset of the spatial streams, $L_i$, to determine its corresponding feedback steering matrix.

The method 100 may operate in a compressed or uncompressed configuration. In an uncompressed configuration, the feedback steering matrices are sent to the AP 14 without compression; while in a compressed configuration, the matrices are sent to the AP 14 in the form of angles representing compressed versions of the feedback steering matrices. In either case, at the block 104, each of the stations, 25-1 and 25-2 in the 2 station example, sends their determined feedback steering matrix, $V_i$, to the AP 14, which obtains descriptions of the downlink channels from each of the stations at a block 106 that is, in some embodiments, at least partially execute by the channel estimation unit 62.

At a block 108, as may be implemented by the steering vector controller 60, he AP 14 determines steering vectors, $W_1, W_2, \ldots W_K$, based on the received feedback steering matrices, $V_K$, from each of the stations. In an example implementation in which 2 stations, 25-1 and 25-2, provide feedback steering matrices, $V_1$ and $V_2$, respectively, the block 108 may determine the steering matrices as follows. A computer channel matrix, $H_K$, for each of the stations is related to the feedback steering matrix, $V_K$, as follows:

$$H_1 = U_1 D_1 V_1^T \text{ and } H_2 = U_2 D_2 V_2^T$$

The received signal at station 25-1 is $y_1$ and at station 25-2 is $y_2$, expressed as follows:

$$y_1 = H_1(W_1 x_1 + W_2 x_2) + n_1 = U_1 D_1 V_1^T (W_1 x_1 + W_2 x_2) + n_1 \quad \text{(Eq. 4)}$$

$$y_2 = H_2(W_1 x_1 + W_2 x_2) + n_2 = U_2 D_2 V_2^T (W_1 x_1 + W_2 x_2) + n_2 \quad \text{(Eq. 5)}$$

To completely avoid interference at both the users, the AP 14 determines steering matrices that simultaneously satisfy the following conditions:

$$V_1^T W_2 = 0 \quad V_2^T W_1 = 0$$

That is, the AP 14 selects the columns that lie in the null space of $V_1$ and $V_2$ and thereby null the interference at each of the users. For example, $W_1$ will lie in the null space of $V_2$ and vice versa.

In another example implementation in which 3 stations, 25-1, 25-2, and 25-3, provide feedback back steering matrices, $V_1$, $V_2$, and $V_3$ respectively, the block 108 may determine the steering matrices using the following expressions:

$$H_1 = U_1 D_1 V_1^T, H_2 = U_2 D_2 V_2^T \text{ and } H_3 = U_3 D_3 V_3^T \quad \text{(Eq. 6)}$$

$$y_i = U_i D_i V_i^T \left( \sum_{k=1}^{3} W_k x_k \right) + n_k$$

The AP 14 can thus determine the three steering matrices that simultaneously satisfy the following conditions:

| $V_1^T[W_2 W_3] = 0$ | $V_2^T[W_1 W_2] = 0$ | $V_2^T[W_1 W_2] = 0$ |
| --- | --- | --- |

The optimization metric applied at block 108 is interference nulling at each of the stations. The AP 14, however, may use any suitable optimization in response to the multiple received feedback steering matrices. In some examples, the AP 14 can use a more complicated decision metric, such as choosing steering vectors to maximize the sum capacity or minimize the average mean square error (MSE) at each receiver, etc. Other decision metrics including zero-forcing, and leakage suppression. The steering vector controller 60 at least partially executes the block 108, in some embodiments.

At the block 108, the steering vectors for each of the stations $W_1, W_2, \ldots W_K$ are concurrently generated in view of the multiple channel descriptions obtained at the block 106. In an example scenario, three steering vectors for use with three receiving stations are concurrently generated in view of the three channel descriptions corresponding to the three channels via which data is simultaneously transmitted to the stations.

In the method 100, each station feeds back to the AP 14 the full set of vectors for the corresponding steering matrix, a ranging feedback. In other embodiments, instead of feeding back the entire steering matrix, the station will feed back a set of vectors, i.e., null-steering vectors, spanning the null space of the corresponding feedback steering matrix, $V_K$, in particular, a null space feedback signal formed of a set of the vectors in the steering matrix, V. An example method 300 is illustrated in FIG. 4.

Figure 4:
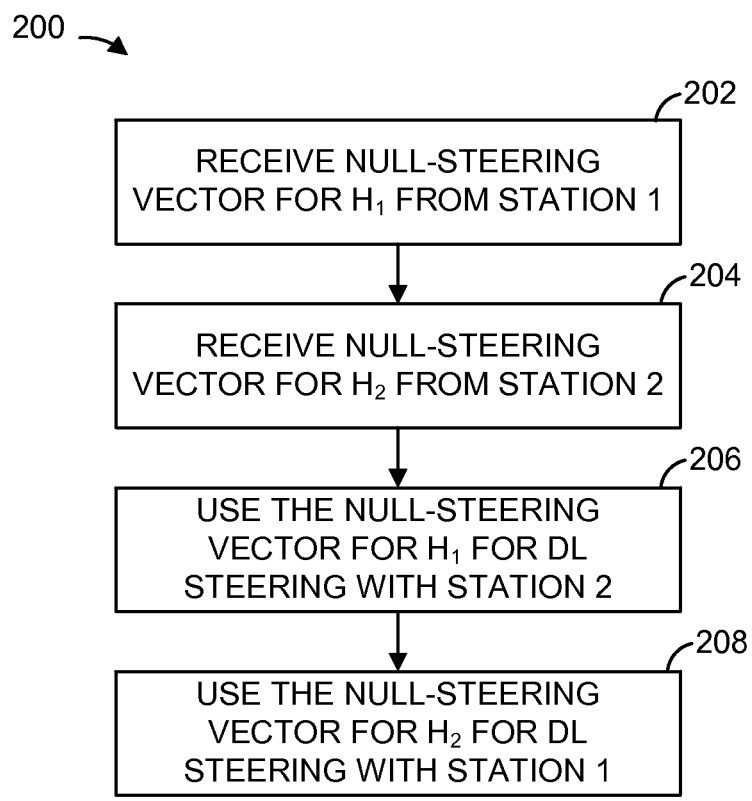
FIG. 4 is a flow diagram of an example method for generating a pair of steering vectors for use with two stations operating in an SDMA mode using a null-steering vector, according to an embodiment.

FIG. 4 is a flow diagram of an example method 200 that an AP implements to generate a pair of transmit steering vectors for simultaneous transmission of data to a corresponding pair of stations, according to an embodiment. The method 200 yields steering vectors that form an aggregate steering vector similar to a block-nullified aggregate steering vector, for example. The DL SDMA controller 19 or the SDMA controller 50, for example, is configured to implement the method 200, according to some embodiments.

At block 202, an indication (e.g., mathematical description) of a first null-steering vector for a communication channel between the AP and the first station is received. The first null-steering vector corresponds to a null-space projection of the first communication channel. In other words, for a communication channel described by $H_1$, the first null-steering vector is a vector that the AP 14 can apply to completely or nearly completely attenuate a signal a station will receive via the communication channel described by $H_1$. The AP 14 thus can use the null-space steering vector for a first station to avoid having that first station interfere with communications to a second station. At block 204, an indication of a second null-steering vector for a communication channel between the AP and the second station is received. Similar to the first null-steering vector, the second null-steering vector is a vector that the AP can apply to completely or nearly completely attenuate a signal a station will receive via the communication channel described by $H_2$. Both blocks 202 and 204 are illustrated separately but may be implemented simultaneously and at least partially using the channel estimation unit 62.

At blocks 206 and 208, steering vectors for use in simultaneous downlink transmissions to the first station and the second station are generated using the first null-steering vector and the second null-steering vector. In particular, the steering vector $W_1$ for use with the first station and the channel described by $H_1$ is assigned the value of the second null-steering vector, and the steering vector $W_2$ for use with the second station and the channel described by $H_2$ is assigned the value of the first null-steering vector. In this manner, a pair of transmit steering vectors $W_1$ and $W_2$ is developed for simultaneous transmission of data to the first and second stations, without interference from the other station.

The station can use any of numerous techniques to determine the null-steering vector fed back to the AP 14. In an embodiment, each station numerically determines the null space by computing the SVD of the channel matrix, $SVD(H_i)$, and then selects the eigenvectors with eigenvalues smaller than a implementation dependent threshold. The set of collected vectors form the basis for the null space of the channel matrix. In other examples, such as with implicit beamforming, this same process can be performed at the AP, in response to CSI feedback from each of the clients.

Another approach to determine the null space is to do a linear projection. For example, assuming V is a column-wise orthonormal matrix (e.g., the singular vectors of the channel matrix), then $V_{null} = Null(V) = a(I - VV^*) W$, where a is a normalization factor, W could be any matrix (e.g. a column-wise orthonormal matrix) with a number of columns equal to the dimension of the null space of V, and I is the identity matrix.

Figure 5:
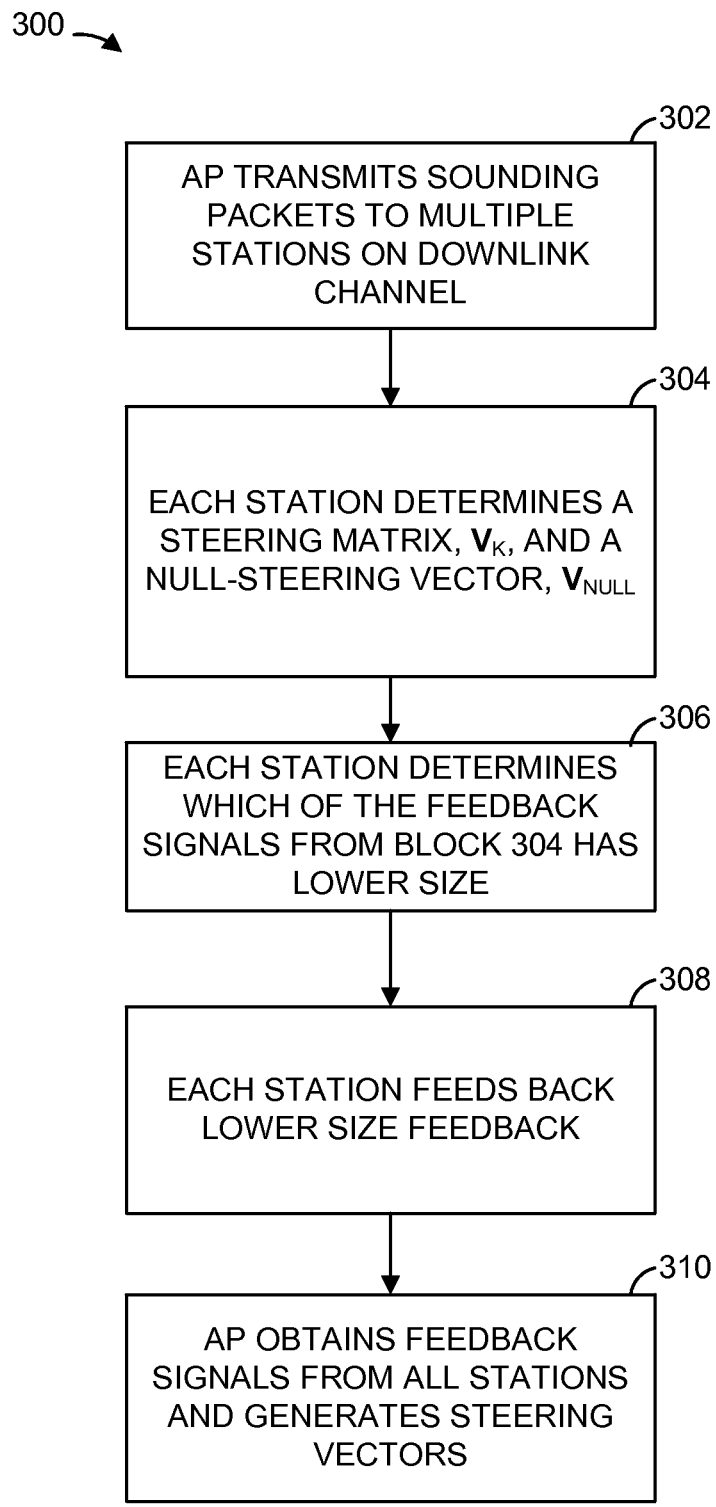
FIG. 5 is a flow diagram of an example method for generating a pair of steering vectors using a hybrid feedback steering matrix or null-steering vector technique in an SDMA mode using a null-steering vector, according to an embodiment.

FIGS. 3 and 4 illustrate examples of a station determining a feedback steering matrix and a feedback null-steering vector, respectively. In other embodiments, the station may determine both. For both the range feedback and null space feedback schemes, the amount of feedback depends on the number of transmit antennas at the AP and the number of receive antennas at the client. FIG. 5 illustrates another feedback method 300, which is a hybrid feedback scheme. After the AP transmits the sounding packets at a block 302, at a block 304, each station computes the amount of feedback in the feedback schemes discussed earlier. That is, at the block 304, each station determines a full feedback steering matrix, $V_K$, and a null-steering vector. At a block 306, the station determines which of the two feedback signals result in the least amount of size on the feedback signal, and at a block 308, the station feeds back the corresponding feedback signal to the AP 14, where the type of feedback sent by the client to the AP may be indicated in the category field of a management action frame, in some embodiments. Depending on the type of fed back signal, either method 100 or 200 may be implemented to determine the steering vectors at a block 310, executed by the AP.

In other embodiments, the AP can request that the stations provide a specific type of feedback, based on the AP's own estimate of the feedback amounts that would likely be needed for each feedback type.

The type of feedback from the station, i.e., CSI, noncompressed beamforming, compressed beamforming, or null-space vector, can be identified as a steering subfield field of a 3 bit high-throughput (HT) control filed or a very high throughput (VHT) control field in a MAC header of the feedback frame.

In all the previously introduced feedback methods 100, 200, and 300, (e.g., feedback steering matrix, null-steering vectors, or hybrid thereof), each station may optionally (or mandatorily) attach a number of spatial streams (Nss) subfield in the feedback frame, where the value Nss identifies the number of spatial streams that the AP should use in communicating with the particular station. The AP may use the identified number of spatial streams or few spatial streams, depending on conditions determined at the AP, including the feedback channel descriptions from each of the stations as well as interference avoidance determinations made at the AP. Each station determines its own suitable number of spatial streams (Nss).

In some examples when the station sends a feedback steering matrix, the number of streams, Nss, is equal to or less than the number of columns (Nc) of the singular vector feedback matrix. In some examples of a null-steering vector feedback, the number of spatial streams Nss is equal to or less than (Nrx−Nnull), where Nnull is the number of columns in the feedback and Nrx is the number of antenna at the station. For example, for a station having three antenna, such as 25-1, the station may choose to suggest 2 streams, Nss=2, for itself in the multiple station packet, so the extra receive antenna may be used for interference mitigation.

In some embodiments, the station also optionally (or mandatory) attaches to the feedback signal substream signal-to-noise ratios (SNRs) averaged over the received downlink channels, i.e., tones. The number of SNRs used to determine a linear average, for example, may be equal to or less than Nc or (Nrx−Nnull). In this way, for the null-steering vector feedback, the number of SNRs transmitted back to the AP, then implies the number of streams (Nss) preferred by the transmitting station.

In some embodiments, the indicated number of spatial streams, Nss, can be extended by having multiple user (i.e., multiple station) feedback, as in 802.11ac, and single user (i.e., single station) feedback share the same feedback steering matrix, V, format. For example, a station may always feedback a V matrix, with the maximum possible channel rank (or maximum number of singular vectors).

In some embodiments, in place of providing an Nss field, each station may include within the feedback frame, a desired number space-time streams, Nsts. For example, the station may provide a Nsts field for single user communication, discussed below, and/or multiple user communication, discussed above. Space-time streams refer to streams of modulation symbols created by applying a combination of spatial and temporal processing to one or more spatial streams of modulation symbols. The feedback frame includes subfields for both, indicating the preferred Nsts or num of columns in V if the feedback steering matrices V are used for single user beamforming and the preferred Nsts or num of columns in V if the feedback steering matrices V are used for multiple user precoding.

The example method 200 of FIG. 3 describes a null-space vector feedback that is used by the AP to determine steering vectors, $W_1, W_2, \ldots W_K$, for simultaneously multiple station beamforming. In some examples, however, the AP uses the null-space vector(s) for single station beamforming, e.g., when there is no simultaneous communication with other stations. In such examples, the AP uses the null-space feedback, Null(V), to compute a steering matrix V' and steer to the particular station using that matrix. The AP may use numerous different approaches to determine V'. In some examples, the AP directly converts received null-steering vectors to range vectors. If $V_{null}$=Null(V) is the fed back vector—the vectors are to be column-wise orthonormal—then the AP determines ranging vectors, V', according to the following:

$$V'=\alpha(I-V_{null}V_{null}^*)W, \qquad \text{(Eq. 7)}$$

where α is a normalization factor, and W can be any matrix (e.g. column-orthonormal matrix) with number of columns equal to the desirable number of streams in the steered transmission, and I is the identity matrix. Once determined, the AP uses V' as the single user steering matrix, $W_K$.

The null-space conversion may be implemented at either the station or the AP. For example, the station may convert a received range vector into a null-steering vector, which is fed back to the AP. The AP receiving the null-steering vectors converts them to range vectors. In other embodiments, for example, when the AP receives feedback steering vectors, V, the AP creates the null-steering vectors. That is, for Eq. 7, if $V_{null}$ is a ranging steering vector, instead of null-steering vector, then V' in the expression becomes the null-steering vector of the ranging vector $V_{null}$.

Figure 6:
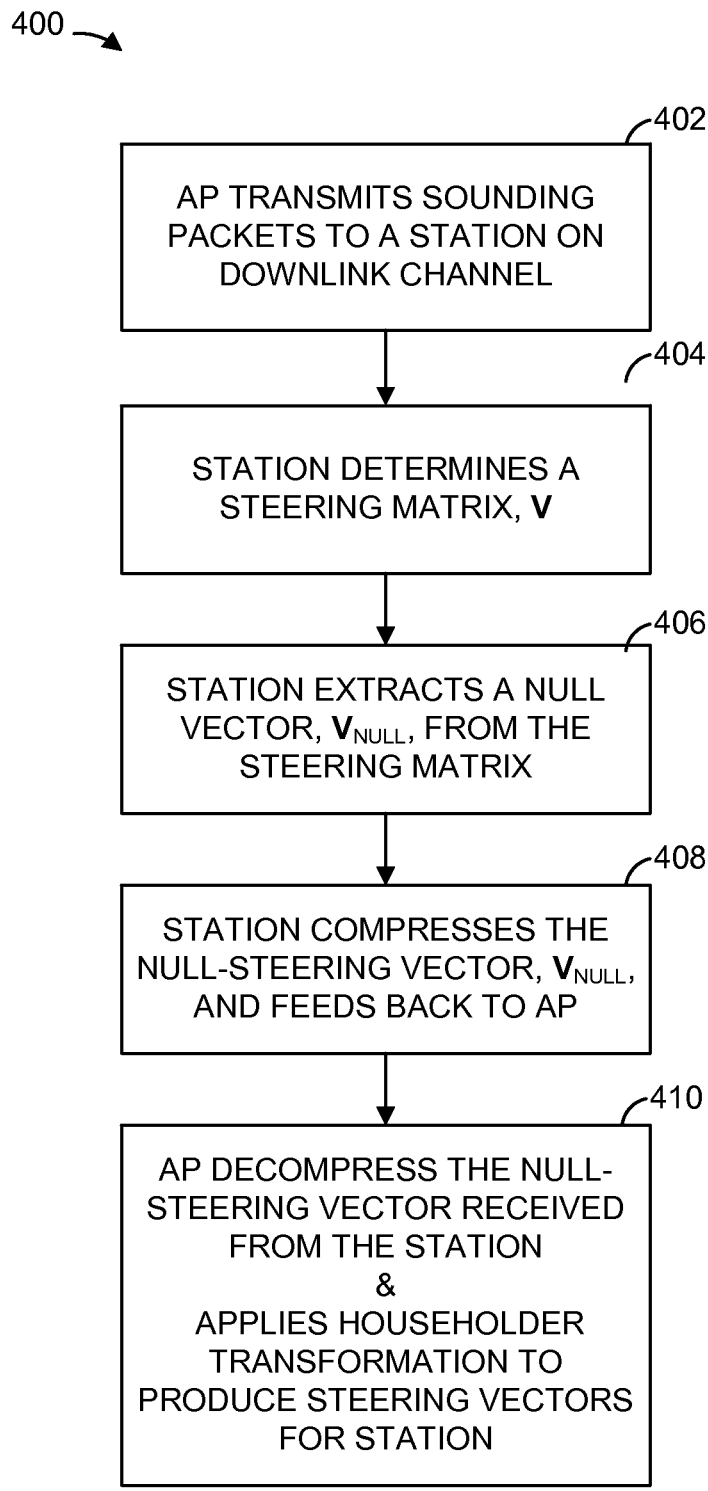
FIG. 6 is a flow diagram of an example method for generating a steering vector for DL SDMA transmissions from a null-steering vector fed back from a station, according to an embodiment.

FIG. 6 illustrates a method 400 providing another technique for null-space conversion, from null-steering vectors to ranging steering vector, to produce steering vectors for single station communication between the AP and one of the stations. While numerous conversion techniques may be used, the method 400 applies a Householder transform, which is at least partially implemented by the DL SDMA controller 19. The illustrated example is described in the context of single station communication; however, in other embodiments the techniques can be used for simultaneous communication with different stations and with reduced potential interference for each communication channel.

At a block 402, the AP sends downlink channel signals to a station using a channel matrix, H. In the illustrated example, the channel matrix is a 3×4 matrix, having 3 spatial streams. At a block 404, after receiving the downlink channel signal, the station decomposes its own channel matrix to obtain its own steering matrix, V. At a block 406, the station extracts the null-steering vector $V_{null}$, which in the discussed example is the last column of the V matrix 4×1. At a block 408, the station compresses the null-steering vector $V_{null}$ and feeds it back to the AP. At a block 410, the AP decompresses the feedback null-steering vector, $V_{null}$ (4×1), from the station and applies a householder matrix conversion to convert the null-space signal to range-space vectors, $\hat{V}$, which in this example represent the first 3 columns of the steering matrix, V, i.e., $\hat{V}$ (4×3). For downlink communications, the AP uses the determine ranging vectors, $\hat{V}$, as the steering vectors. The null-steering vector, $V_{null}$, is not needed for single station communications.

The following describes some example techniques for determining a Householder matrix as may be applied by the block 410, in determining determine $\hat{V}$ from $V_{null}$, such that the product of $\hat{V}'$ and $V_{null}$ equals 0, i.e., $\hat{V}'\cdot V_{null}$=0, where $\hat{V}'$ is the conjugate transpose of $\hat{V}$.

Before discussing some general techniques for null-steering vector conversion, the method 400 is discussed for determining a 4×3 $\hat{V}$ matrix from null-steering vector, 4×1, $V_{null}$.

The AP receives the null-steering vector, $V_{null}$, and sets it to a vector, x=$V_{null}$, such that a transformation vector, v, can be defined as follows:

$$v=x+\text{sign}(x(1))*\text{norm}(x)*e_1 \qquad \text{(Eq. 8)}$$

where $e_1$ is a vector [1 0 . . . 0]. Next the vector, v, is normalized according to:

$$v=v/\text{norm}(v) \qquad \text{(Eq. 9)}$$

From the normalized vector, v, the AP determines a Householder reflector matrix, HR, according to:

$$HR=I_{MT}-2vv' \qquad \text{(Eq. 10)}$$

where I is an identity matrix and MT is the number of transmit antennas for the AP. The vector product HR'·x has all zero entries except the first, i.e., for a 4×3 matrix the $2^{nd}$ through last columns of the householder reflect matrix HR are orthogonal to vector x. With orthogonality, the steering matrix, $\hat{V}$, that the AP will apply for communicating with the corresponding station is determined as follows:

$$\hat{V}=HR(:,2:\text{end}), \qquad \text{(Eq. 11)}$$

where the steering matrix $\hat{V}$ is a 4×3 matrix.

More generally, the block 410 may implement the following processes to determine the steering matrix, $\hat{V}$, from a null-steering vector, $V_{null}$, for any arbitrary m×n matrix.

A vector A is set equal to the received $V_{null}$, A=$V_{null}$, where [m,n]=size(A). An identity vector, Q, of m length is then determined, for example, applying Q=eye(m). For single station communication, the following expression is used to determine the minimum value for all but the last, m, column, i.e., for k=1:min(m−1,n). A vector $a_k$ is defined as follows:

$$a_k=A(k:\text{end},k). \qquad \text{(Eq. 12)}$$

This vector is zeroed out to determine a $v_k$ according to the following:

$$v_k=a_k+\text{sign}(a_k(1))\cdot\text{norm}(a_k)\cdot[1;\text{zeros}(m-k,1)]. \qquad \text{(Eq. 13)}$$

A Householder reflector matrix is then defined from $v_k$ as follows:

$$HR_k=\text{eye}(m-k+1)-2v_k\cdot v_k'/(v_k'\cdot v_k). \qquad \text{(Eq. 14)}$$

From this Householder reflector matrix a matrix is determined as follows:

$$Q_k = [\text{eye}(k-1) \text{zeros}(k-1, m-k+1); \text{zeros}(m-k+1, k-1) \; HR_k]; \quad (\text{Eq. 15})$$

The vector A is then updated by $A = Q_k A$ as is Q by $Q = Q^* Q_k$. The steering matrix, $\hat{V}$ is then set as follows:

$$\hat{V} = Q(:, n+1:\text{end}) \quad (\text{Eq. 16})$$

The AP confirms that $\hat{V}' \cdot V_{null} = 0$, so that all the columns of $\hat{V}$ are orthogonal to $V_{null}$.

Figure 7:
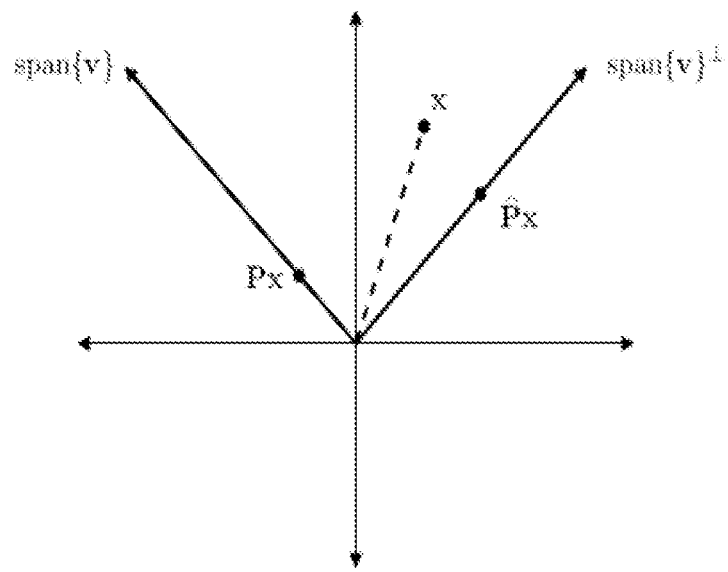
FIGS. 7-10 illustrate geometrically steps of a Householder transformation used to transform a null-steering vector into a steering matrix for use in DL SDMA transmissions to a single station, according to an embodiment.

FIGS. 7-10 illustrate geometrically the Householder transform of null-steering vectors for an arbitrary vector. A matrix P is a projector provided by $P^2 = P$, where if P is also Hermitian, then P is an orthogonal projector. As shown in FIG. 7, a vector x can be projected into the direction of span{v} and into the direction of span{v}_null, by using P, where both vectors are orthogonal to each other as shown. Generally, P satisfies the following conditions $$P = \frac{vv^*}{v^* v} \quad (\text{Eq. 17})$$

$$\hat{P} = I - P = I - \frac{vv^*}{v^* v}$$

Figure 8:
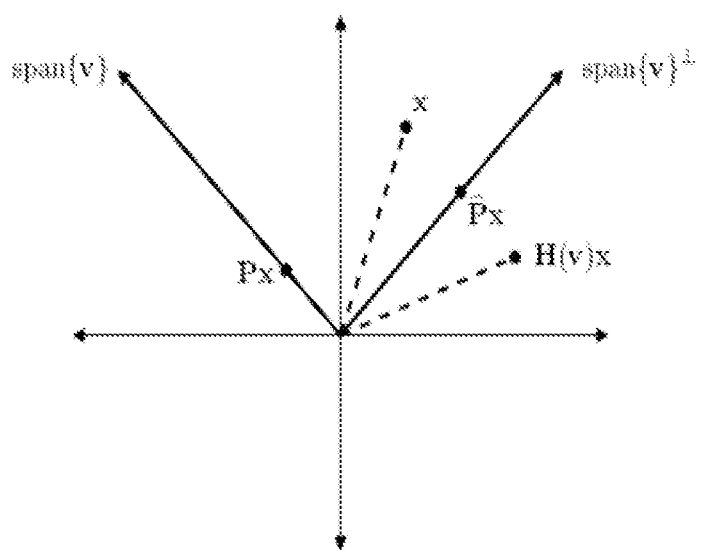

The Householder reflector, HR(v), is a unitary matrix to reflect x over the n−1 dimensional subspace span{v}_null, as shown in FIG. 8. HR(v) can be determined, as follows from the above, from the following:

$$HR(v)x = x - 2Px = (I - 2P)x = \left(I - 2\frac{vv^*}{v^* v}\right)x \quad (\text{Eq. 18})$$

Figure 9:
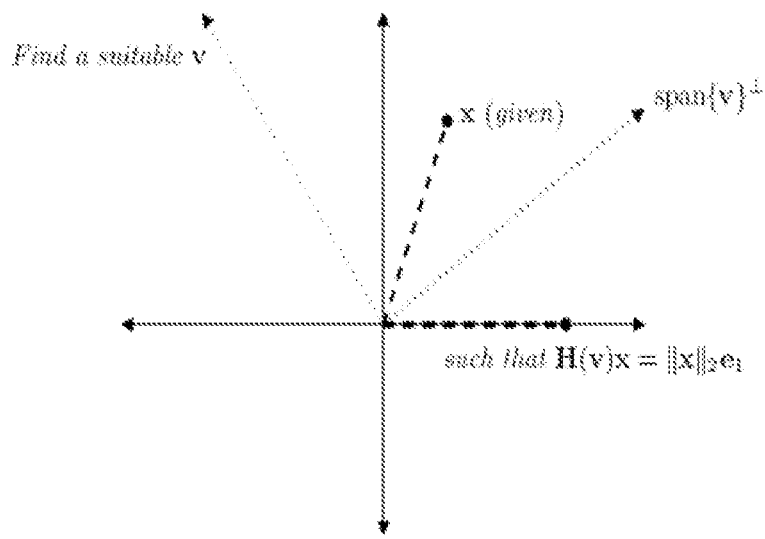

The value $\hat{P}x$ is a midpoint of x and the Household reflector of x, HR(v)·x. HR(v)·x is a multiplication of a matrix and a vector. Therefore, in order to get the null-space vector of x, the reflector HR(v) should map (project) x to the direction of $e_1 = [1, 0, \ldots, 0]$. All the vectors of FIG. 8, are rotated in FIG. 9. That is, as shown in FIG. 9, the columns from $2^{nd}$ to the end of HR(v) will be orthogonal to x, i.e., will be in the null-space of x, thus rending the expression:

$$HR(v)x = \begin{bmatrix} \|x\|_2 \\ 0 \\ \vdots \\ 0 \end{bmatrix} \quad (\text{Eq. 19})$$

The suitable v to project HR(v)x into a base direction is $$v = x - \|x\|_2 e_1 \quad (\text{Eq. 20})$$

Figure 10:
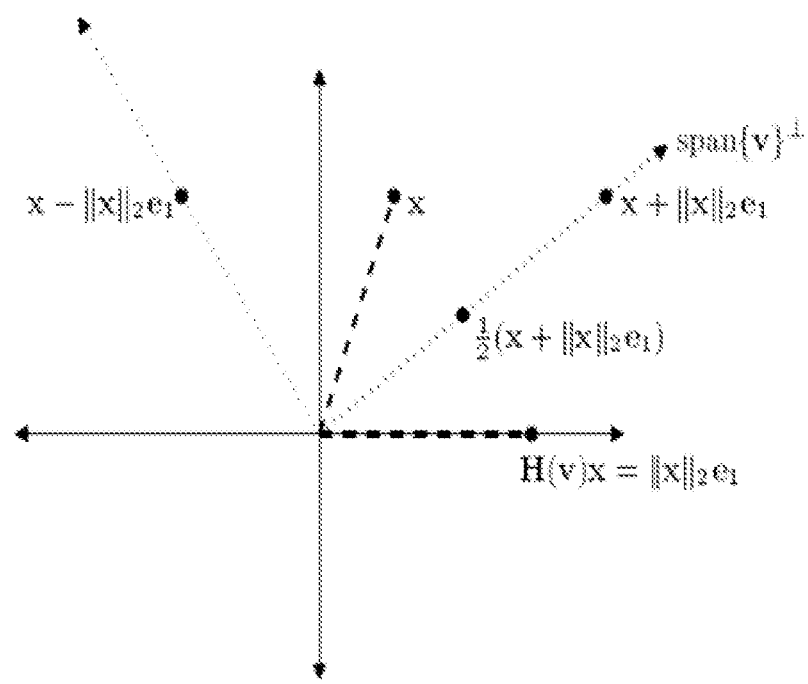

Correspondingly, the midpoint of x and HR(v)·x is in the hyperplan of span{v}_null, as shown in FIG. 10. The vector v is normalized and is used to derive HR(v)=I−2vv'. In this example, HR(v)·x is mapped into $e_1$. However, in other examples, HR(v)·x could be mapped into $-e_1$, then, the sign will be changed as follows:

$$v = x + \|x\|_2 e_1. \quad (\text{Eq. 21})$$

As a result, $v = x + \text{sign}(x(1)) \cdot \text{norm}(x) \cdot e_1$, where $\text{sign}(x) = x/\text{abs}(x)$, where FIG. 10 illustrates the resulting projections of v.

The Householder reflector is used for QR decomposition. For example, $$A = QR \Leftrightarrow Q^* A = R$$

Q can be decomposed into a series of $Q_k$ $$Q_n Q_{n-1} \cdots Q_1 A = R,$$

where $$Q_k = \begin{pmatrix} I & 0 \\ 0 & H(v_k) \end{pmatrix},$$

where I is a (k−1) by (k−1) identity matrix, and $HR(v_k)$ is (n−k+1) dimensional Householder reflector. Example resulting expressions are as follows:

$$Q_1 A = \begin{pmatrix} r_{11} & r_{12} & \cdots & r_{1n} \\ 0 & & & \\ \vdots & & A_2 & \\ 0 & & & \end{pmatrix}$$

$$Q_2 Q_1 A = \begin{pmatrix} r_{11} & r_{12} & r_{13} & \cdots & r_{1n} \\ 0 & r_{22} & r_{23} & \cdots & r_{2n} \\ 0 & 0 & & & \\ \vdots & \vdots & & A_3 & \\ 0 & 0 & & & \end{pmatrix}$$

The number of floating point operation required for QR decomposition is $$\sum_{k=1}^{n} 4(m-k+1)(n-k+1) \approx 2mn^2 - \frac{2n^3}{3} \quad (\text{Eq. 22})$$

where n, m is the size of dimension of $A \in c^{m \times n}$. However, to achieve the null-space vectors for a single vector, a single Householder transform is enough, i.e., n=1 is sufficient, thereby greatly reducing the QR decomposition calculation.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention. For example, one or more operations in methods discussed above may be performed in a different order (or concurrently) and still achieve desirable results.

What is claimed is:

1. A method, comprising:
   receiving, at an access point device, a plurality of beamsteering feedback frames from a plurality of client devices in connection with a procedure for generating respective steering matrices for performing multiple user communications with the plurality of client devices, including receiving a first beamsteering feedback frame from a first client device, the first beamsteering feedback frame including i) first compressed beamsteering information corresponding to a first communication channel between the access point device and the first client device and ii) an indication of a preferred number of streams to be used when the access point performs single user beamformed communications with the first client device;
   generating, at the access point device, the respective steering matrices using compressed beamforming information included in the plurality of beamsteering feedback frames, including using the first compressed beamsteering information to generate a first steering matrix for transmitting to the first client device as part of a multiple user beamformed transmission to the plurality of client devices;
   generating, at the access point device, a second steering matrix for transmitting to the first client device as part of a single user beamformed transmission using the first compressed beamsteering information; and
   using, at the access point device, the indication of the preferred number of streams in the first beamsteering feedback frame to determine how many streams to utilize when transmitting to the first client device as part of a single user beamformed transmission.

2. The method of claim 1, wherein:
   the first compressed beamsteering information includes a first compressed beamsteering matrix; and
   the first beamsteering feedback frame further includes an indication of a number of columns of the first compressed beamsteering matrix.

3. The method of claim 1, wherein:
   the first compressed beamsteering information includes a first compressed beamsteering matrix corresponding to a singular value decomposition (SVD) of a channel estimation matrix corresponding to the first communication channel between the access point device and the first client device.

4. The method of claim 1, wherein:
   receiving the plurality of beamsteering feedback frames from the plurality of client devices further includes receiving one or more second beamsteering feedback frames from one or more second client devices, the one or more second beamsteering feedback frames including one or more respective second compressed beamsteering information corresponding to one or more respective second communication channels between the access point device and the one or more respective second client devices; and
   generating the first steering matrix includes using the one or more respective second compressed beamsteering information in order to reduce interference to the one or more respective second client devices when using the first steering matrix to transmit to the first client device as part of the multiple user beamformed transmission to the plurality of client devices.

5. The method of claim 1, further comprising:
   transmitting, by the access point device, a sounding packet to the plurality of client devices;
   wherein the plurality of beamsteering feedback frames from the plurality of client devices include compressed beamsteering information determined by the plurality of client devices based on reception of the sounding packet at the plurality of client devices.

6. An apparatus, comprising:
   a wireless network interface device of an access point device, the wireless network interface device configured to receive a plurality of beamsteering feedback frames from a plurality of client devices in connection with a procedure for generating respective steering matrices for performing multiple user communications with the plurality of client devices, including receiving a first beamsteering feedback frame from a first client device, the first beamsteering feedback frame including i) first compressed beamsteering information corresponding to a first communication channel between the access point device and the first client device and ii) an indication of a preferred number of streams to be used when the access point performs single user beamformed communications with the first client device;
   wherein the wireless network interface device includes a steering matrix controller configured to:
      generate the respective steering matrices using compressed beamforming information included in the plurality of beamsteering feedback frames, including using the first compressed beamsteering information to generate a first steering matrix for transmitting to the first client device as part of a multiple user beamformed transmission to the plurality of client device, and
      generate a second steering matrix for transmitting to the first client device as part of a single user beamformed transmission using the first compressed beamsteering information; and
   wherein the wireless network interface device is further configured to use the indication of the preferred number of streams in the first beamsteering feedback frame to determine how many streams to utilize when transmitting to the first client device as part of a single user beamformed transmission.

7. The apparatus of claim 6, wherein:
   the first compressed beamsteering information includes a first compressed beamsteering matrix; and
   the first beamsteering feedback frame further includes an indication of a number of columns of the first compressed beamsteering matrix.

8. The apparatus of claim 6, wherein:

the first compressed beamsteering information includes a first compressed beamsteering matrix corresponding to a singular value decomposition (SVD) of a channel estimation matrix corresponding to the first communication channel between the access point device and the first client device.

9. The apparatus of claim 6, wherein:

the wireless network interface device is further configured to receive one or more second beamsteering feedback frames from one or more second client devices, the one or more second beamsteering feedback frames including one or more respective second compressed beamsteering information corresponding to one or more respective second communication channels between the access point device and the one or more respective second client devices; and the steering matrix controller is further configured to use the one or more respective second compressed beamsteering information to generate the first steering matrix in order to reduce interference to the one or more respective second client devices when using the first steering matrix to transmit to the first client device as part of the multiple user beamformed transmission to the plurality of client devices.

10. The apparatus of claim 6, wherein:

the wireless network interface device is further configured to transmit a sounding packet to the plurality of client devices;

wherein the plurality of beamsteering feedback frames from the plurality of client devices include compressed beamsteering information determined by the plurality of client devices based on reception of the sounding packet at the plurality of client devices.

11. The apparatus of claim 6, wherein wireless network interface device comprises a plurality of transceivers.

12. The apparatus of claim 11, further comprising:

a plurality of antennas coupled to the plurality of transceivers.

* * * * *